(12) United States Patent
Sun et al.

(10) Patent No.: US 7,454,751 B2
(45) Date of Patent: Nov. 18, 2008

(54) FAULT-TOLERANT SYSTEM AND METHODS WITH TRUSTED MESSAGE ACKNOWLEDGEMENT

(75) Inventors: Mingqiu Sun, Beaverton, OR (US); Mahesh Bhat, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 619 days.

(21) Appl. No.: 09/876,645

(22) Filed: Jun. 7, 2001

(65) Prior Publication Data

US 2002/0188650 A1     Dec. 12, 2002

(51) Int. Cl.
*G06F 9/46* (2006.01)
*G06F 11/00* (2006.01)

(52) U.S. Cl. .................. 718/101; 718/104; 714/100

(58) Field of Classification Search ......... 718/100–108; 709/200–253; 714/2, 47–48, 100; 717/102
See application file for complete search history.

(56) References Cited

U.S. PATENT DOCUMENTS

| | | | | |
|---|---|---|---|---|
| 5,014,192 A | * | 5/1991 | Mansfield et al. .......... 707/1 |
| 5,463,208 A | * | 10/1995 | Sasou et al. ............ 235/380 |
| 5,465,328 A | * | 11/1995 | Dievendorff et al. ......... 714/15 |
| 5,832,455 A | * | 11/1998 | Hayashi et al. ............ 705/7 |
| 5,850,518 A | | 12/1998 | Northrup | |
| 5,974,392 A | | 10/1999 | Endo | |
| 6,055,273 A | | 4/2000 | Isomura ................. 375/240 |
| 6,289,474 B1 | | 9/2001 | Beckerle | |
| 6,442,533 B1 | | 8/2002 | Hinkle | |
| 6,578,159 B1 | * | 6/2003 | Kitagawa et al. .......... 714/15 |
| 6,651,163 B1 | | 11/2003 | Kranich et al. ........... 712/244 |
| 6,801,938 B1 | | 10/2004 | Bookman et al. | |
| 6,859,462 B1 | * | 2/2005 | Mahoney et al. .......... 370/428 |
| 7,010,602 B2 | | 3/2006 | Poindexter et al. | |
| 2001/0024497 A1 | * | 9/2001 | Campbell et al. ...... 379/265.09 |
| 2001/0027477 A1 | * | 10/2001 | Nakamura et al. ......... 709/206 |
| 2001/0056492 A1 | | 12/2001 | Bressoud et al. .......... 709/227 |
| 2002/0052771 A1 | * | 5/2002 | Bacon et al. ............... 705/8 |
| 2002/0065701 A1 | * | 5/2002 | Kim et al. ................. 705/9 |

(Continued)

OTHER PUBLICATIONS

Maffeis, Silvano, "Middleware Support for Application-to-Application Wireless Messaging", Jul. 2000, WROX Professional Wireless Developers Conference, pp. 1-17.*

(Continued)

*Primary Examiner*—Meng-Ai An
*Assistant Examiner*—Kenneth Tang
(74) *Attorney, Agent, or Firm*—Schwegman, Lunberg & Woessner, P.A.

(57) ABSTRACT

Improved methods for providing fault tolerance in a distributed computer system utilize an explicit, delayed acknowledgement message protocol to send an acknowledgement message to a workflow-requesting entity, such as a load manager and/or a requesting client, only upon completion of a workflow. The system includes workflow engines operating as a distributed queue group to load-balance processing requests from clients. The system also has a certified messaging capability that guarantees delivery of any message sent by a certified message sender by maintaining a persistent record of the message until an acknowledgement message is received back from the certified message receiver. In the event a hardware or software failure occurs during a workflow execution, the workflow is reassigned to a different workflow engine. Improved fault-tolerant computers and computer networks are also described.

12 Claims, 6 Drawing Sheets

U.S. PATENT DOCUMENTS

2002/0112008 A1    8/2002   Christenson et al. ........ 709/206
2003/0101211 A1*   5/2003   Northrup .................... 709/203

OTHER PUBLICATIONS

"U.S. Appl. No. 09/876,673, Final Office Action mailed Jun. 6, 2005", 8 pgs.

"U.S. Appl. No. 09/876,673, Non-Final Office Action mailed Aug. 18, 2004", 8 pgs.

"U.S. Appl. No. 09/876,673, Response files Nov. 7, 2005 in response to Final Office Action mailed Jun. 6, 2005", 10 pgs.

"U.S. Appl. No. 09/876,673, Response files Feb. 18, 2005 in response to Non-Final Office Action mailed Aug. 18, 2004", 18 pgs.

"U.S. Appl. No. 09/876,673, Response filed Aug. 13, 2007 in response to Non-Final Office Action mailed Apr. 19, 2007", 14 pgs.

"U.S. Appl. No. 09/876,673 Non-Final Office Action mailed Apr. 19, 2007", 10 pgs.

* cited by examiner

FAULT-TOLERANT SYSTEM AND METHODS WITH TRUSTED MESSAGE ACKNOWLEDGEMENT

RELATED INVENTION

The present invention is related to the following invention which is assigned to the same assignee as the present invention and which was filed on even date herewith:

Ser. No. 09/876,673 entitled "Systems and Methods for Recoverable Workflow" filed on Jun. 7, 2001.

TECHNICAL FIELD OF THE INVENTION

The present invention relates generally to the field of data processing and, more particularly, to improved apparatus and methods for implementing fault tolerance.

BACKGROUND OF THE INVENTION

In a mission-critical, distributed computing environment, fault tolerance is essential for ensuring high system reliability and availability. "Fault tolerance", as used herein, means that a client, whether a human end user or an element of a computer system or network, does not perceive any computer failure when the client requests execution of a task or series of tasks, even though the computer system or network may incur partial failure in the course of completing the client's request.

Many fault-tolerant systems are known in the data processing arts. Some are implemented mainly in hardware, such as hardware-assisted clustering, while others are implemented mainly in software, such as message-based systems. However, because it is relatively complex to implement, fault tolerance is usually available only in high-end computer systems, and the implementing software is typically bulky and expensive.

For the reasons stated above, and for other reasons stated below which will become apparent to those skilled in the art upon reading and understanding the present specification, there is a significant need in the art for fault-tolerant systems and methods that are light-weight, inexpensive, and readily scalable for use on computer systems of virtually any size or market segment.

DETAILED DESCRIPTION OF EMBODIMENTS OF THE INVENTION

In the following detailed description of embodiments of the invention, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, procedural, mechanical, and electrical changes may be made without departing from the spirit and scope of the present inventions. The following detailed description is, therefore, not to be taken in a limiting sense, and the scope of the present invention is defined only by the appended claims.

The present invention provides a fault tolerance capability in relatively low-cost computer systems. Various embodiments are illustrated and described herein. In one embodiment, a distributed computer system utilizes software that provides an explicit, delayed acknowledgement message protocol. This protocol sends an acknowledgement message to a workflow-requesting entity, such as a load manager and/or a requesting client, only upon completion of the requested workflow. By utilizing workflow engines operating as a distributed queue group to load-balance processing requests from clients, and by additionally utilizing a certified messaging capability, if a hardware or software failure occurs during a workflow execution, the workflow requester fails to receive the expected acknowledgement message, so the workflow is reassigned to a different workflow on a different workflow engine.

Improved methods for providing fault tolerance in a data processing system or a computer network are described. In addition, a fault-tolerant computer system and a computer-readable medium comprising computer instructions for providing fault tolerance are also described. The improved fault tolerance techniques are inexpensive, lightweight, and scalable, and they can significantly increase the commercial value of computer systems in the low-cost market segment.

Figure 1:
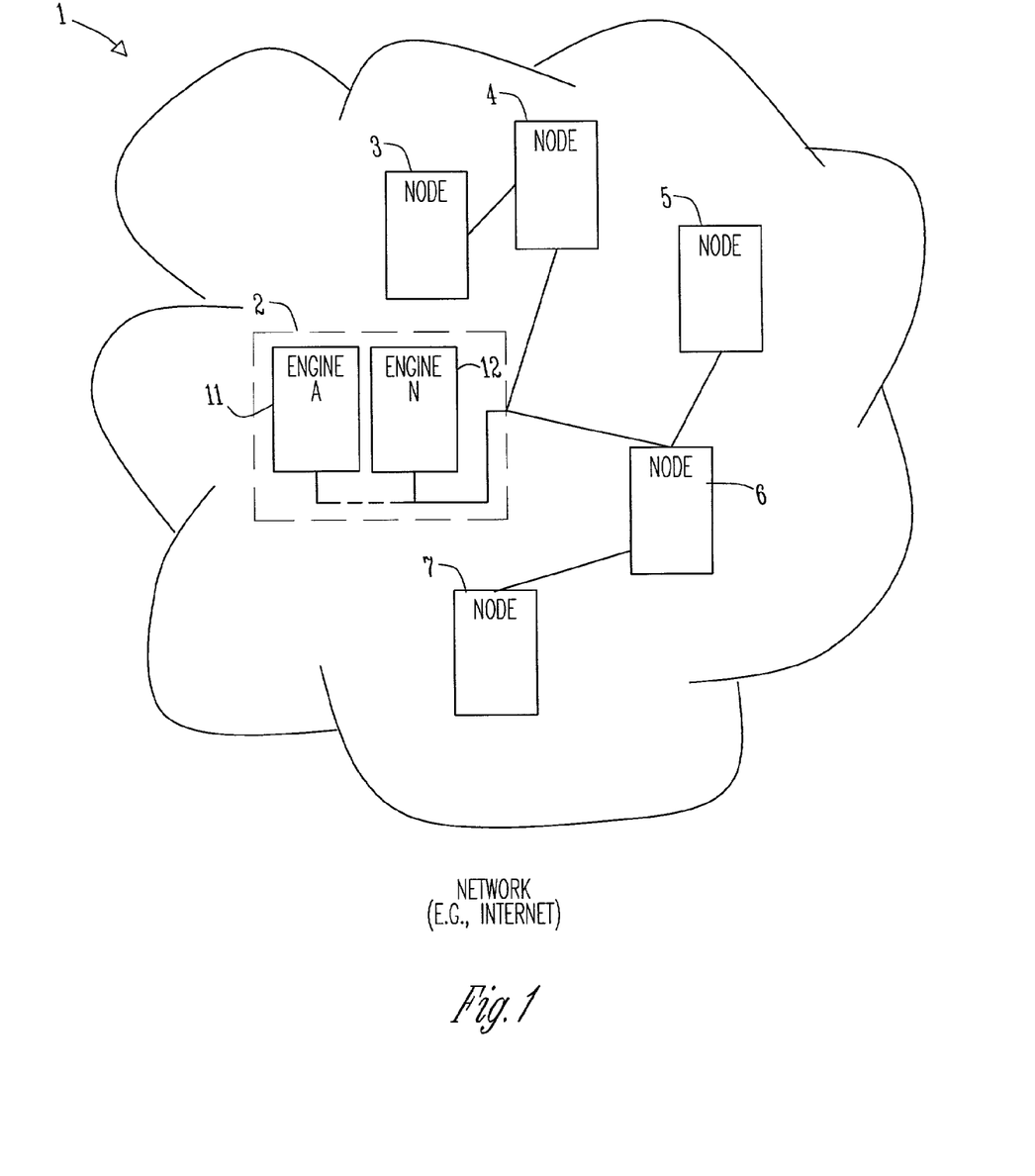
FIG. 1 is a block diagram of a computer network that includes a fault-tolerant system, in accordance with one embodiment of the invention.

FIG. 1 is a block diagram of a computer network 1 that includes a fault-tolerant system 2, in accordance with one embodiment of the invention. Computer network 1 is merely one example of a system in which a fault-tolerant system 2 of the present invention can be used. In this example, computer network 1 is the Internet. Although only a small quantity of computer nodes 2-7 is shown, the number of possible active nodes can number in the hundreds of millions. Nodes 2-7 are illustrated as being coupled to form a network. The particular manner in which nodes 2-7 are coupled is not important, and they can be coupled in any desired physical or logical configuration and through any desired type of wireline or wireless interfaces.

Network 1 can be a public or private network. Network 1 can alternatively be small in size, such as a two-computer network within a home, vehicle, or enterprise. As used herein, an "enterprise" means any entity organized for any purpose, such as, without limitation, a business, educational, government, military, entertainment, or religious purpose.

Nodes 2-7 can be of any type, including end-user or client computers; network nodes such as switches, routers, hubs, concentrators, gateways, portals, and the like; servers; and other kinds of computers used for any purpose. Moreover, node 2 can function independently of network 1, so it need not necessarily be connected to network 1. For example, node 2 could be coupled to network 1 always, periodically, or never.

In one embodiment, nodes 2-7 can include client computers in a business-to-business (B2B) and/or business-to-consumer (B2C) e-commerce network. B2B and B2C e-commerce networks are increasingly being utilized to enhance communications between enterprises, their customers, their suppliers, as well as with other entities with whom information is desired to be communicated. As a result, enterprises can potentially reduce certain costs of doing business, such as, without limitation, operational costs, sales and marketing costs, advertising costs, inventory costs, shipping costs, labor costs, and accounting costs. In addition, consumers can potentially benefit from B2C e-commerce networks in various ways, such as increased product selection, faster delivery, quality forums, sales alerts, price comparisons, content personalization, and so forth.

Figure 2:
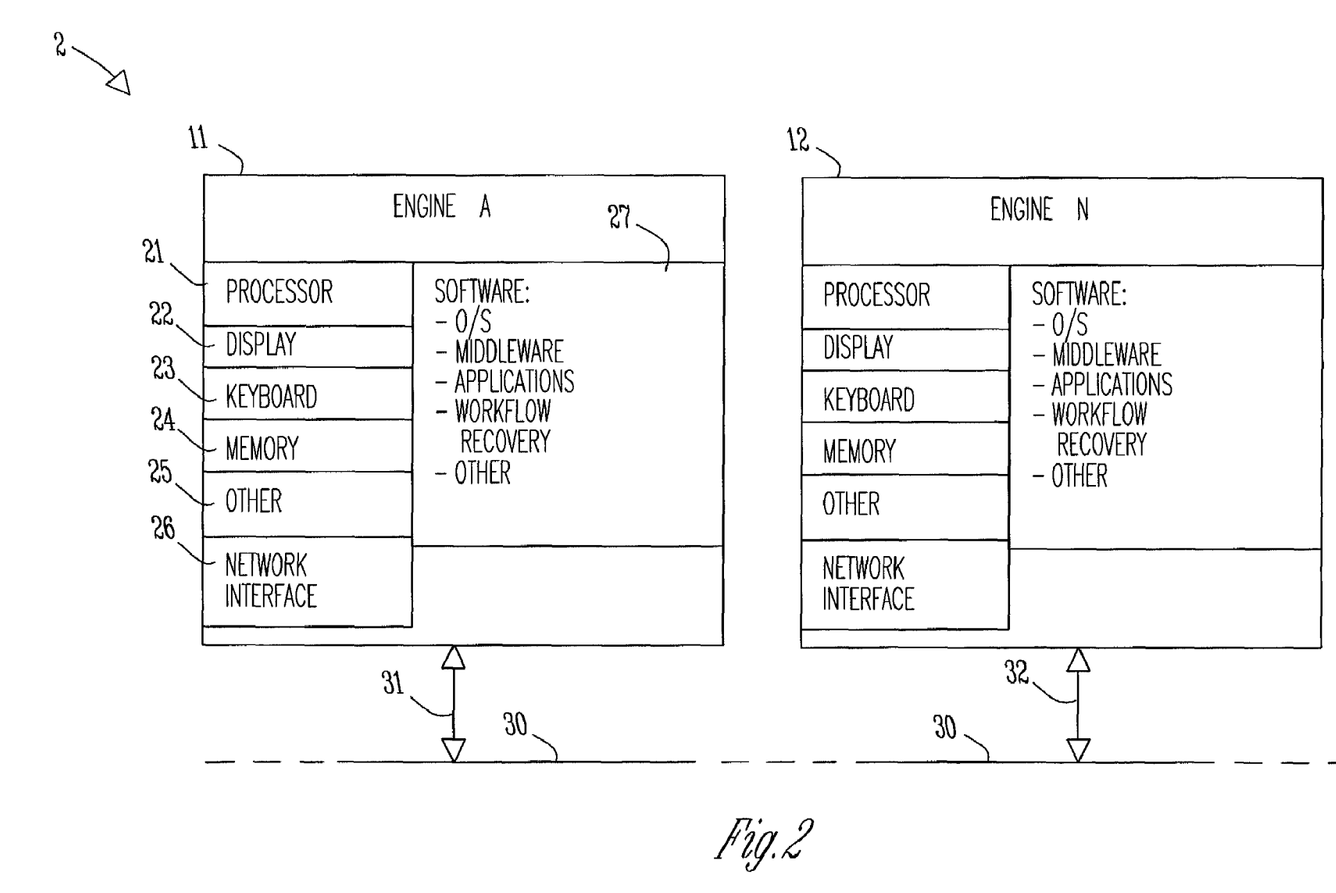
FIG. 2 is a more detailed block diagram of a fault-tolerant system, in accordance with one embodiment of the invention.

FIG. 2 is a more detailed block diagram of a fault-tolerant system 2, in accordance with one embodiment of the invention. Fault-tolerant system 2 comprises at least two computers 11 and 12, and in some embodiments fault-tolerant system 2 can comprise a large number of computers. In the embodiment illustrated, computer 11 may also be referred to as Engine A, and computer 12 may also be referred to as Engine N. Computers 11 and 12 can be substantially identical, as shown in FIG. 2, or they can alternatively be quite different in physical and functional features, depending upon the requirements of the network of which they form a part.

Computer 11 comprises, for example, at least one processor 21 that can be of any suitable type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit.

Computer 11 further comprises, for example, suitable user interface equipment such as a display 22, a keyboard 23, a pointing device (not illustrated), voice-recognition device (not illustrated), and/or any other appropriate user interface equipment that permits a system user to input information into and receive information from computer 11.

Computer 11 further comprises memory 24 that can be implemented in one or more forms, such as a main memory implemented as a random access memory (RAM), read only memory (ROM), one or more hard drives, and/or one or more drives that handle removable media such as compact disks (CDs), diskettes, magnetic tape cartridges, and other types of data storage.

Computer 11 further comprises a network interface element 26 to couple computer 11 to network bus 30 via network interface bus 31. Network bus 30 provides communications links among the various components of the fault-tolerant system 2, as well as to other nodes of a more comprehensive network, if desired, and it can be implemented as a single bus, as a combination of busses, or in any other suitable manner. Computer 12 is coupled to network bus 30 via network interface bus 32, which can be equivalent to network interface bus 31.

Computer 11 can also include other hardware elements 25, depending upon the operational requirements of computer 11. Hardware elements 25 could include any type of hardware, such as modems, printers, loudspeakers, scanners, plotters, and so forth.

Computer 11 further comprises a plurality of types of software programs, such as operating system (O/S) software, middleware, application software, fault tolerance software, and any other types of software as required to perform the operational requirements of computer 11. The middleware, application software, and fault tolerance software will be discussed in greater detail below.

Figure 3:
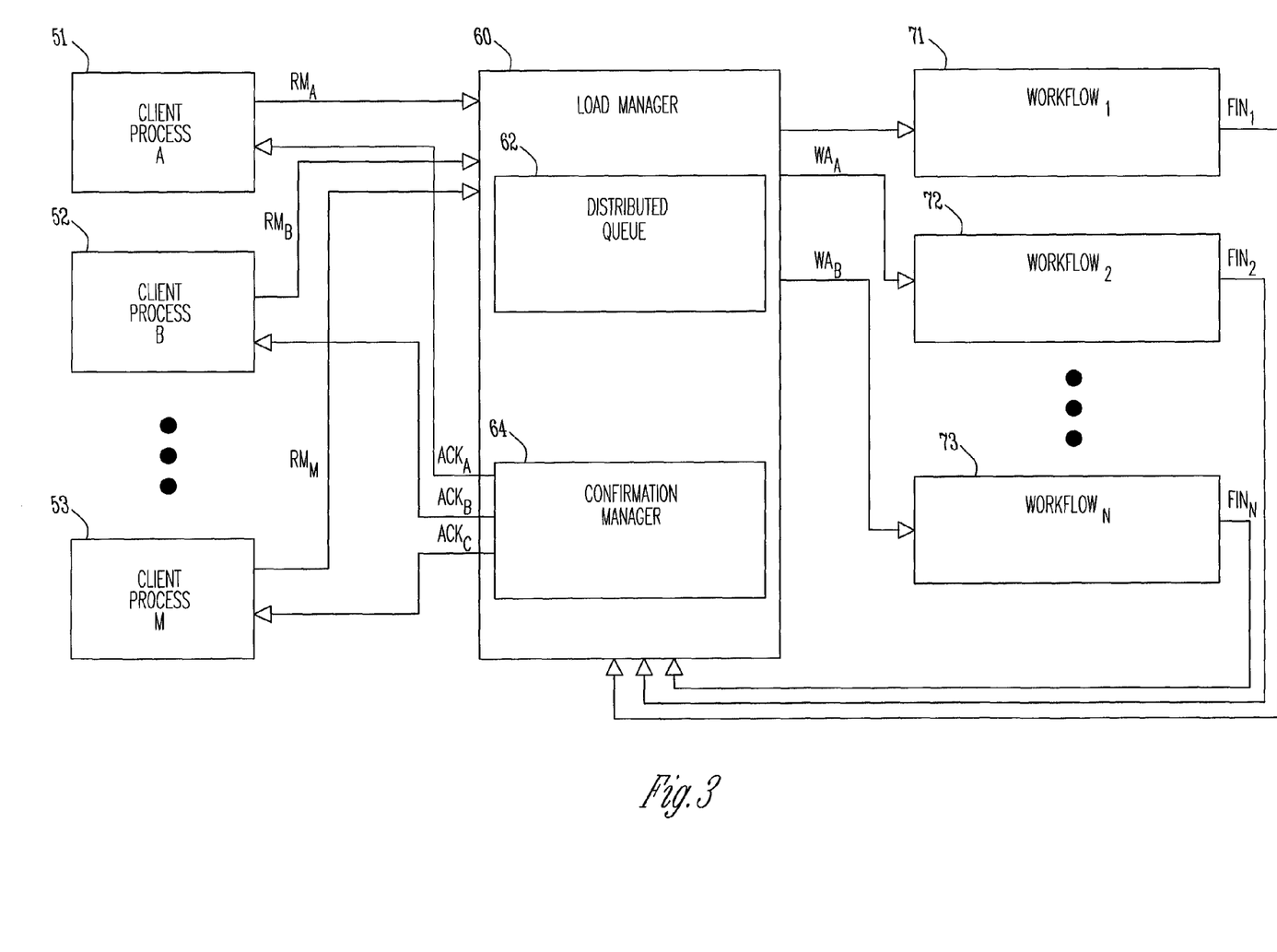
FIG. 3 is a block diagram illustrating a fault-tolerant mechanism within a computer system comprising a number (M) of client processes and a number (N) of workflows, in accordance with one embodiment of the invention.

FIG. 3 is a block diagram illustrating a fault-tolerant capability within a computer system comprising a number (M) of client processes 51-53 and a number (N) of workflows 71-73, in accordance with one embodiment of the invention.

Client processes 51-53 may also be referred to herein as client processes A, B, and M, respectively. Client processes 51-53 can reside on one or more of nodes 2-7 (FIG. 1).

Load manager 60 can be provided within any suitable hierarchical or organizational level of software 27 (FIG. 2). In one embodiment, load manager 60 is implemented as a combination of middleware and specific fault tolerance software; however, other implementations are possible. For example, load manager 60 could be implemented within the operating system, within the middleware, or within a combination of operating system and middleware software. Alternatively, load manager 60 could be implemented within any combination of operating system, middleware, and application software.

Load manager 60 comprises a distributed queue 62 and a confirmation manager 64. In one embodiment, distributed queue 62 forms part of a commercially available middleware program. While any of various commercially available middleware products could be used, one embodiment of the invention uses TIB™ available from TIBCO Software Inc., Palo Alto, Calif., U.S.A. whose URL is "tibco.com". Other commercially available middleware products that can be used include MQ Series from IBM Corporation, Armonk, N.Y. , U.S.A., Microsoft MessageQueue (MSMQ) from Microsoft Corporation, Redmond, Wash. , U.S.A., and DEC Message-Queue from Digital Equipment Corporation, Maynard, Mass., U.S.A.

Figure 4:
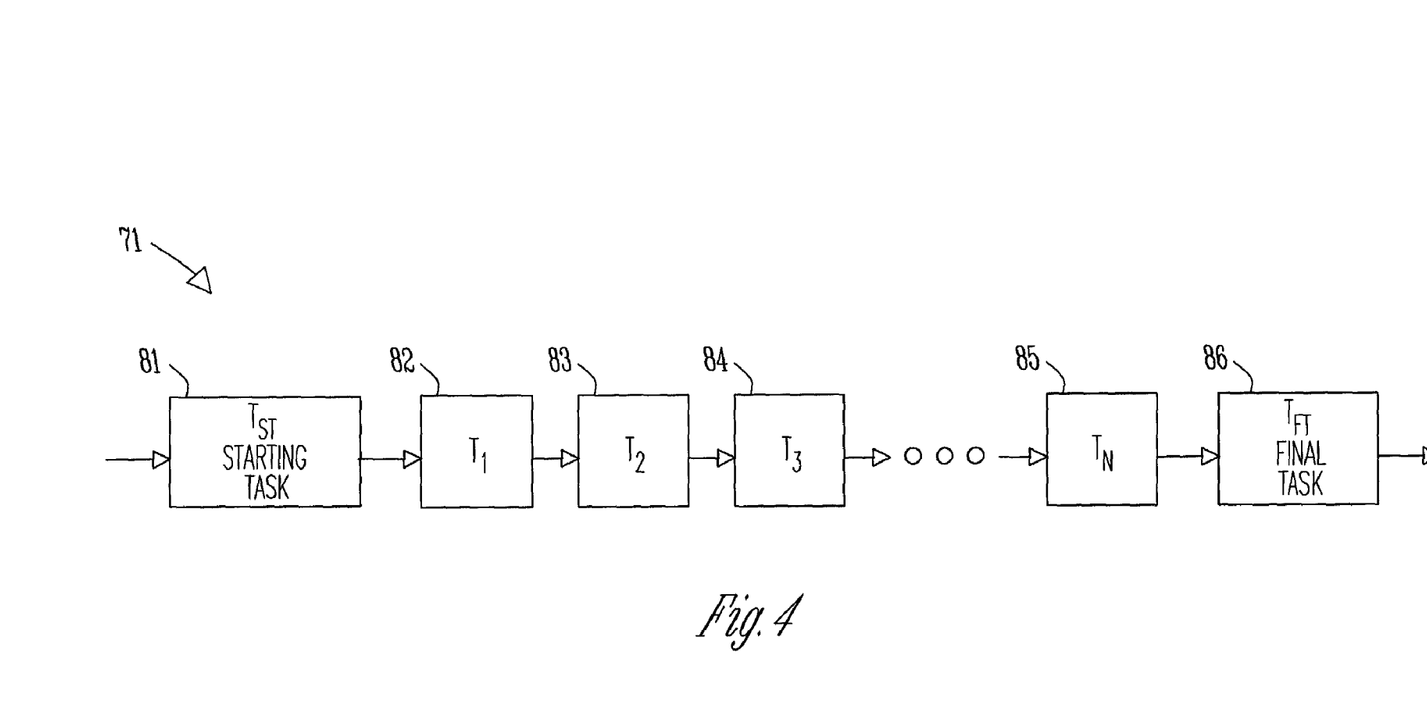
FIG. 4 is a block diagram representation of an example workflow, in accordance with one embodiment of the invention.

Workflows 71-73 may also be referred to herein as Workflow$_1$ through Workflow$_N$, respectively. Workflows 71-73 can reside on one or more of nodes 2-7 (FIG. 1). However, to enhance fault tolerance, workflows 71-73 generally reside on separate computer systems. An example of a workflow is illustrated in FIG. 4 and is described below with reference to FIG. 4.

Still referring to FIG. 3, using a commercially available middleware product, such as TIB, each workflow can be assigned for execution on a separate computer system, also referred to herein as a "workflow engine". Each workflow engine includes an instance of the application software module(s) necessary to execute any workflow to be performed by it. The load manager 60 is aware of the workflow engines that it has at its disposal, and it balances the processing load among the available workflow engines as new requests for, or messages pertaining to, workflow execution that originate from clients are placed in a work queue, such as distributed queue 62. This attribute of the TIB middleware software is referred to as "distributed queuing". Each new client request or message is evaluated by the load manager 60 and appropriately dispatched to a workflow engine to be executed. Each new request or message can be processed by a single workflow engine or by several workflow engines executing the request or message either concurrently or sequentially. Load manager 60 can dispatch client requests or messages to workflow engines using any suitable algorithm, such as a round-robin assignment, an assignment based upon the type of request or message, and so forth.

In addition to providing distributed queuing, a commercially available middleware product, such as TIB, can typically provide a "certified messaging" function. As used herein, "certified messaging" means that messages are guaranteed to be delivered even if the sender, receiver, and/or network are not functioning concurrently with the message delivery event. A "certified message publisher" means a computer process that sends out certified messages to a computer network to which it is coupled. A "certified message receiver" (also called a "certified message listener" herein) means a computer process that receives certified messages. When a certified message is sent by a certified message publisher, a persistent record is maintained until an acknowledgement message is received back from the certified message receiver, usually automatically and immediately upon receiving the message.

The function and operation of a fault-tolerant provision within a computer system comprising a number (M) of client processes 51-53 and a number (N) of workflows 71-73, in accordance with one embodiment of the invention, will now be described with reference to FIG. 3.

When a particular client process, e.g. client process A, wants to have a workflow performed, it sends a request message $RM_A$ to load manager 60. Request message $RM_A$ can be a certified message. Request message $RM_A$ goes into distributed queue 62. Load manager 60 eventually assigns the client-originating request to one of workflows 71-73, depending on various factors, such as the type of request, the availability status of workflows 71-73, and so forth. Let it be assumed in this particular example that load manager 60 assigns the client-originating request to workflow 72, in which case load manager 60 sends a workflow assignment message $WA_A$ to workflow 72. Workflow assignment message $WA_A$ can be a certified message.

Workflow 72 performs one or more tasks to carry out the desired client-requested function(s). When workflow 72 concludes its final task $T_{FT}$ (see FIG. 4), workflow 72 sends a finished message $FIN_2$ to confirmation manager 64 of load manager 60. Finished message $FIN_2$ can be a certified message. Workflow 72 does not send finished message $FIN_2$ to confirmation manager 64 until workflow 72 has completed all processing operations, including final task $T_{FT}$ (refer to FIG. 4).

When confirmation manager 64 receives finished message $FIN_2$ from workflow 72, confirmation manager 64 sends an acknowledgement message $ACK_A$ to client process A notifying client process A that workflow 72 has been performed. Acknowledgement message $ACK_A$ can be a certified message. Acknowledgement message $ACK_A$ to client process A may be referred to as a "delayed acknowledgement message", because such acknowledgement message is only sent to client process A upon the successful completion of the final task $T_{FT}$ by workflow 72. Such an acknowledgement message can be trusted by the client process, in that the client process can assume that the requested function has been successfully completed. This would not be the case if an acknowledgement message were sent to the client process at any time prior to the successful completion of the final task $T_{FT}$ by the assigned workflow.

It will be seen that fault tolerance is provided by the fault-tolerant mechanism illustrated in FIG. 3, because in the event that a software or hardware failure occurs in workflow 71, or if for any reason messages $WA_A$ or $FIN_2$ are not delivered, load manager 60 will eventually realize this fact, and load manager 60 will subsequently reassign the client-originating workflow request to a different workflow, such as workflow 71 or workflow 73. Because workflows 71 and 73 reside on different, independent computer systems than workflow 72, it is highly unlikely that the computer systems that perform workflows 71 or 73, respectively, will be inoperative at the same time as the computer system or workflow engine for workflow 72.

Only one healthy instance of an alternate workflow engine is required to exist. Such alternate workflow engine can pick up the client-originating request that failed to be returned by an earlier assigned workflow, and it can complete processing of such request and then inform confirmation manager 64 to send an acknowledgement message $ACK_i$ to the client that originated the request.

Similar to the manner in which client process A requests a workflow to be performed, if client process B wants to have a workflow performed, it sends a request message $RM_B$ to load manager 60. The process operates essentially as described above regarding a client-originating request from client process A, in that load manager 60 sends a work assignment message $WA_B$ to a particular workflow, e.g. workflow 73, which performs the workflow to its final task $T_{FT}$ and then sends a finished message $FIN_N$ to confirmation manager 64. Confirmation manager 64 then sends an acknowledgement message $ACK_B$ to client process B to notify process B that workflow 73 has been performed. Messages $RM_B$, $WA_B$, $FIN_N$, and $ACK_B$ can be certified messages.

In an alternate embodiment, the function of confirmation manager 64 can be performed within one or more of workflows 71-73 by providing such one or more workflows 71-73 with a resource that generates an appropriate ACK signal to the requesting client when the corresponding workflow 71, 72, and/or 73 has concluded its final task $T_{FT}$. For the purposes of implementing the delayed acknowledgement message function of the invention, it is immaterial where such function is performed, e.g. within the workflows 71-73, within the load manager 60 of the middleware, or elsewhere.

FIG. 4 is a block diagram representation of an example workflow 71, in accordance with one embodiment of the invention. Workflow 71 comprises a starting task ($T_{ST}$) 81 and a final task ($T_{FT}$) 86. Workflow 71 can also include one or more intermediate tasks 82-85, which may also be referred to herein as tasks $T_1$ through $T_N$, respectively. As used herein, "workflow" means one or more processes that together perform a specific function. The processes are generally performed by a computer, but certain processes can be performed by a person. An example of a B2C e-commerce workflow is a consumer logging onto a particular business website to determine the availability and price of an item. An example of a B2B e-commerce workflow is a manufacturer's parts-inventory computer automatically ordering parts from a supplier's parts-stocking computer.

Figure 5:
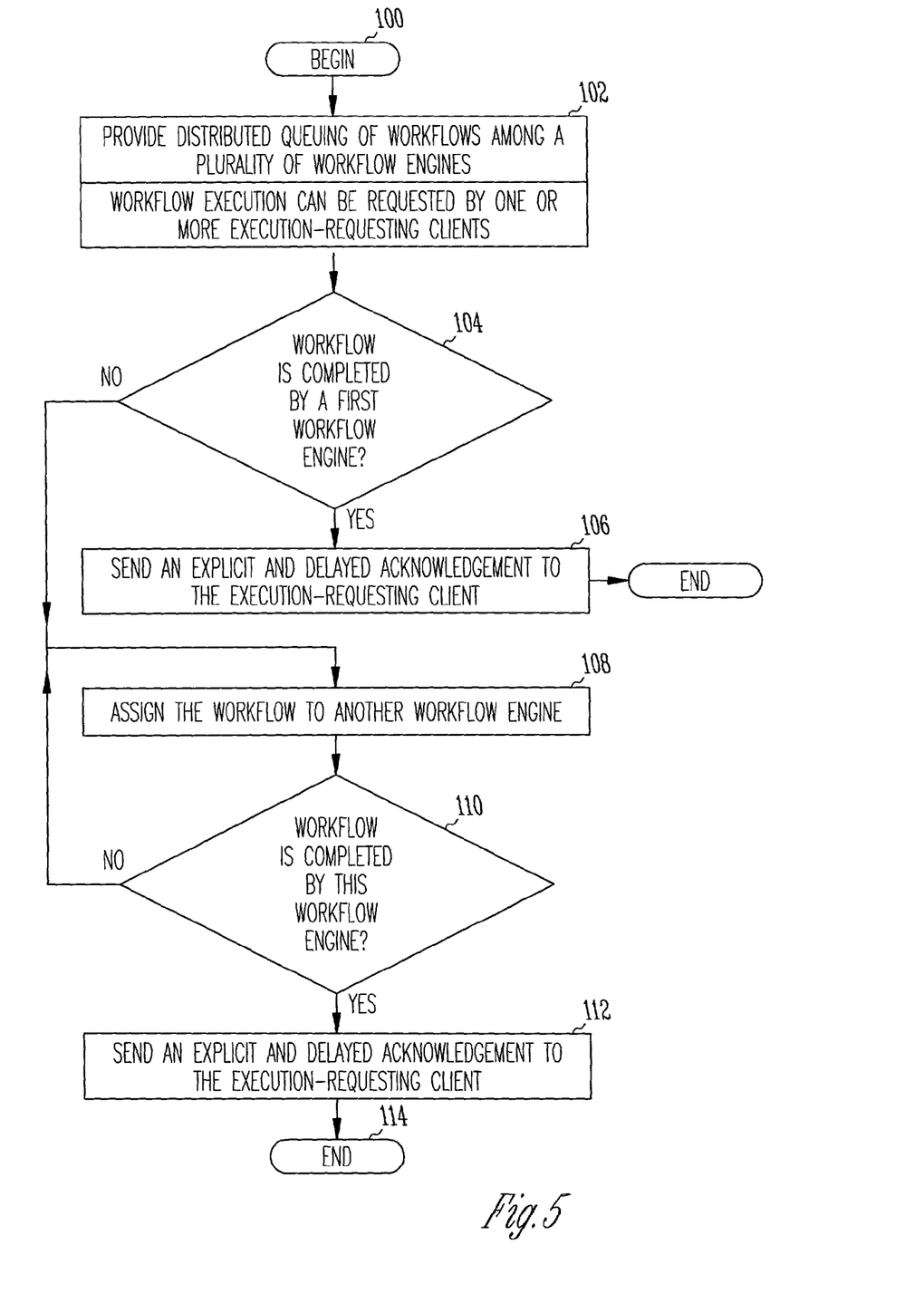
FIG. 5 is a flow diagram illustrating a method of providing fault tolerance in a computer system or computer network, in accordance with one embodiment of the invention.

FIG. 5 is a flow diagram illustrating a method of providing fault tolerance in a computer system or computer network, in accordance with one embodiment of the invention. The method begins at 100.

In 102, distributed queuing of workflows is provided among a plurality of workflow engines. Any one or more clients can request workflow execution.

In 104, a determination is made whether a workflow whose execution has been requested by a client has been completed by a first workflow engine. If so, the method goes to 106; otherwise, it goes to 108. This determination can be made, for example, within load manager 60 (FIG. 3) and can be based upon any suitable algorithm. In one embodiment, the algorithm comprises a timer, so that if a predetermined amount of time has passed without hearing from the first workflow engine, it is assumed that a failure has occurred that will prevent the first workflow engine from returning any results.

In 106, an explicit and delayed acknowledgement is sent to the execution-requesting client, and the method ends.

"Explicit and delayed acknowledgement" is defined to mean a message signifying actual completion of a workflow (as opposed to mere assignment of the workflow to a workflow engine) and which message is not transmitted until completion of the workflow.

In 108, the workflow is assigned to another workflow engine.

In 110, a determination is made whether the workflow has been completed by this workflow engine. If so, the method goes to 112; otherwise, it returns to 108.

In 112, an explicit and delayed acknowledgement is sent to the execution-requesting client, and the method ends at 114.

Figure 6:
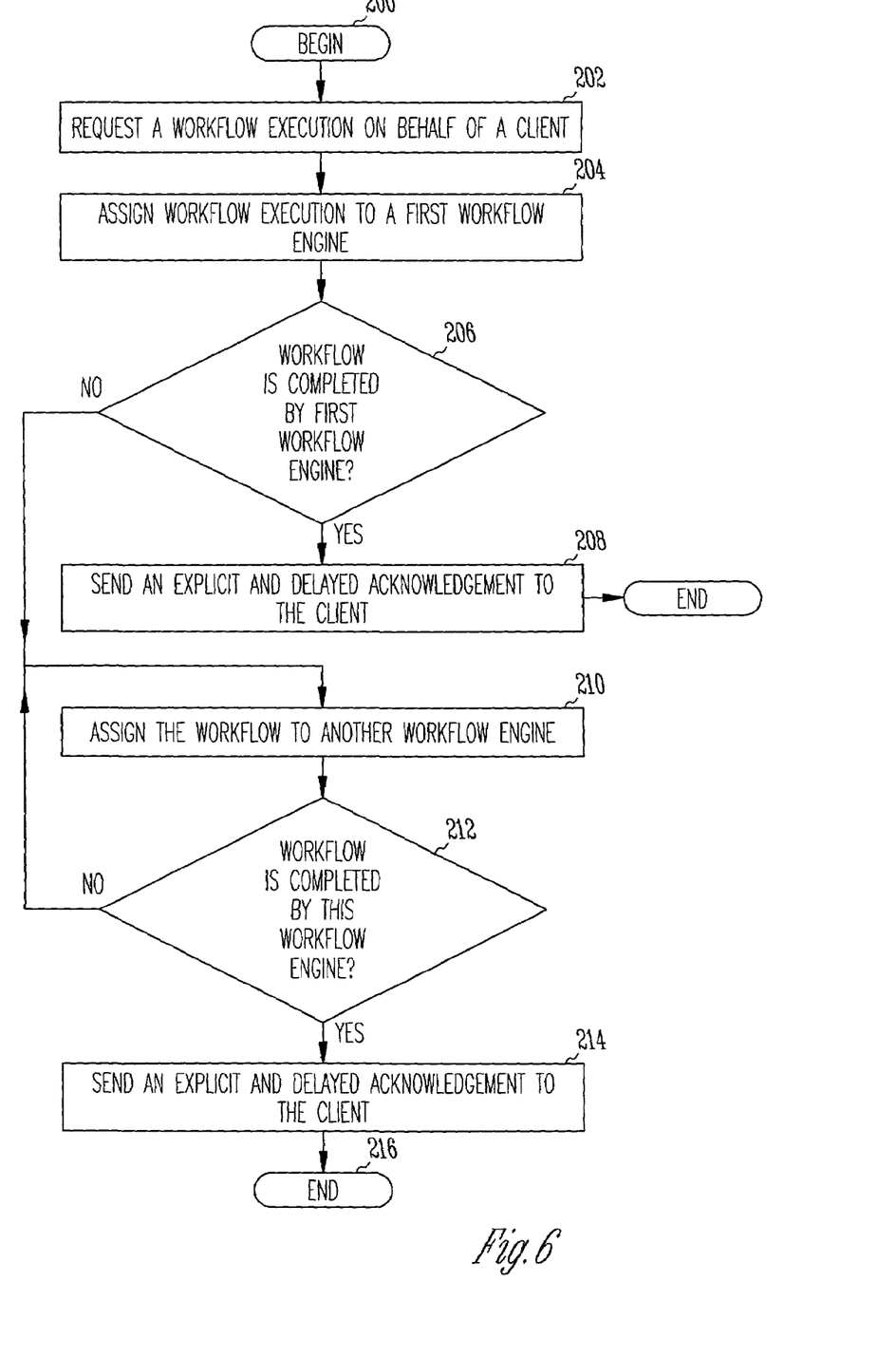
FIG. 6 is a flow diagram illustrating a method of providing fault tolerance in a computer network, in accordance with one embodiment of the invention.

FIG. 6 is a flow diagram illustrating a method of providing fault tolerance in a computer network, in accordance with one embodiment of the invention. The method begins at 200.

In 202, a workflow execution is requested on behalf of a client.

In 204, the workflow execution is assigned to a first workflow engine. As mentioned earlier, the assignment can be made by load manager 60 (FIG. 3) based upon any suitable algorithm.

In 206, a determination is made whether the workflow has been completed by the first workflow engine. If so, the method goes to 208; else, it goes to 210.

In 208, an explicit and delayed acknowledgement is sent to the client, and the method ends.

In 210, the workflow is assigned to another workflow engine.

In 212, a determination is made whether the workflow has been completed by this workflow engine. If so, the method goes to 214; otherwise, it returns to 210.

In 214, an explicit and delayed acknowledgement is sent to the client, and the method ends at 216.

It should be understood that the operations shown in FIGS. 5 and 6 are merely representative and not exclusive, and that many other different alternative operations could be implemented using the concepts taught by the present invention.

The operations described above with respect to the methods illustrated in FIGS. 5 and 6 can be performed in a different order from those described herein. Also, it will be understood that although the methods are described as having an "end", they typically are continuously performed.

Fault tolerance, including a distributed queue capability, a certified messaging capability, and an explicit and delayed acknowledgement capability, is carried out by suitable instructions in one or more computer programs that are stored in and executed by one or more workflow engines 11-12 in FIG. 2. One of ordinary skill in the art is capable of writing suitable instructions to implement an explicit and delayed acknowledgement capability. An example pseudo-code implementation is provided in Appendix A.

The present invention provides for fault-tolerant computer systems and associated methods. Various embodiments have been illustrated and described herein. According to one embodiment, two or more workflow engines operate as a distributed queue group to load-balance processing requests from clients. By utilizing a certified messaging capability to implement an explicit, delayed acknowledgement message protocol, if a hardware or software failure occurs during a workflow execution, the workflow requester fails to receive an expected acknowledgement message. As a result, the workflow is reassigned to a different workflow on a different workflow engine.

Improved methods for providing fault tolerance in a data processing system or computer network have been described. In addition, a fault-tolerant computer system and a computer-readable medium comprising computer instructions for providing fault tolerance have also been described. The improved fault tolerance techniques are inexpensive, lightweight, and scalable, and they can significantly increase the commercial value of computer systems in the low-cost market segment.

Other embodiments will be readily apparent to those of ordinary skill in the art. The elements, architecture, and sequence of operations can all be varied to suit particular fault tolerance requirements.

The various elements depicted in the drawings are merely representational and are not drawn to scale. Certain proportions thereof may be exaggerated, while others may be minimized. The drawings are intended to illustrate various implementations of the invention, which can be understood and appropriately carried out by those of ordinary skill in the art.

Although specific embodiments have been illustrated and described herein, it will be appreciated by those of ordinary skill in the art that any arrangement or process that is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method to be performed by a data processing system to improve fault tolerance comprising:

providing distributed queuing of workflows, whose execution is requested by one or more execution-requesting clients, among a plurality of workflow engines;

only if a workflow is successfully completed by a first workflow engine for an execution-requesting client, sending a notification to the execution-requesting client, else assigning the workflow to a subsequent workflow engine by sending it a work assignment message, in response to which the subsequent workflow engine alone performs the workflow; and sending a notification to the execution-requesting client only if the workflow is successfully completed by the subsequent workflow engine;

wherein sending the notification is performed by a certified messaging capability;

wherein the certified messaging capability is performed by a load manager; and wherein the load manager comprises a commercially available middleware product;

the certified messaging capability sending the notification to the execution-requesting client only if the workflow is successfully completed by the subsequent workflow engine.

2. The method recited in claim 1, wherein providing is performed by the load manager.

3. A method to be performed by a computer network comprising a plurality of clients and a plurality of workflow engines:

providing distributed queuing of workflows, whose execution can be requested by one or more execution-requesting clients, among the plurality of workflow engines; and determining whether a workflow has been successfully completed by a first workflow engine on behalf of an execution-requesting client;

only if so, sending a notification to the execution-requesting client;

otherwise, assigning the workflow to a subsequent workflow engine by sending it a work assignment message, and the subsequent workflow engine alone performing the workflow; and sending a notification to the execution-requesting client only if the workflow is successfully completed by the subsequent workflow engine;
wherein sending is performed by a certified messaging capability;
wherein the certified messaging capability is performed by a load manager; and
wherein the load manager comprises a commercially available middleware product;
the certified messaging capability sending the notification to the execution-requesting client only if the workflow is successfully completed by the subsequent workflow engine.

4. The method recited in claim 3, wherein providing is performed by the load manager.

5. A computer adapted for use in a computer network comprising a plurality of workflow engines, the computer executing a computer program, the computer program operating the computer in a fault-tolerant manner and comprising the operations of:
requesting a workflow execution on behalf of a client;
a distributed queuing capability assigning the workflow execution to a first workflow engine;
determining whether the workflow execution has been successfully completed by the first workflow engine;
only if so, sending a notification to the client;
otherwise, assigning the workflow execution to a subsequent workflow engine by sending it a work assignment message, and the subsequent workflow engine alone performing the workflow; and
sending a notification to the client only if the workflow is successfully completed by the subsequent workflow engine;
wherein sending is performed by a certified messaging capability; and
wherein the certified messaging capability is performed by a certified message receiver in the first workflow engine;
the certified messaging capability sending the notification to the client only if the workflow execution is successfully completed by the subsequent workflow engine.

6. The computer recited in claim 5, wherein requesting is performed by a load manager.

7. A computer network comprising:
a plurality of clients;
a plurality of workflow engines; and
at least one computer program, the computer program operating in a fault-tolerant manner and performing the operations of:
requesting a workflow execution on behalf of a client;
assigning the workflow execution to a first workflow engine;
determining whether the workflow execution has been successfully completed by the first workflow engine;
only if so, sending a notification to the client;
otherwise, assigning the workflow execution to a subsequent workflow engine by sending it a work assignment message, and the subsequent workflow engine alone performing the workflow; and
sending a notification to the client only if the workflow is successfully completed by the subsequent workflow engine;
wherein sending is performed by a certified messaging capability; and
wherein the certified messaging capability is performed by a certified message receiver in the first workflow engine;
the certified messaging capability sending the notification to the client only if the workflow execution is successfully completed by the subsequent workflow engine.

8. The computer network recited in claim 7, wherein requesting is performed by a load manager having a distributed queuing capability.

9. A computer-readable medium containing computer instructions for instructing a processor, the processor adapted for use in a computer network comprising a plurality of workflow engines, wherein the instructions comprise:
requesting a workflow execution on behalf of a client;
a distributed queuing capability assigning the workflow execution to a first workflow engine;
determining whether the workflow execution has been successfully completed by the first workflow engine;
only if so, sending a notification to the client;
otherwise, assigning the workflow execution to a subsequent workflow engine by sending it a work assignment message, and the subsequent workflow engine alone completing the workflow; and
sending a notification to the client only if the workflow is successfully completed by the subsequent workflow engine;
wherein sending is performed by a certified messaging capability; and
wherein the certified messaging capability is performed by a certified message receiver in the first workflow engine;
the certified messaging capability sending the notification to the client only if the workflow execution is successfully completed by the subsequent workflow engine.

10. The computer-readable medium recited in claim 9, wherein requesting is performed by a load manager.

11. An article comprising a machine-accessible medium having instructions for instructing a processor forming part of a plurality of workflow engines, wherein the instructions, when accessed, result in a machine performing:
requesting a workflow execution on behalf of a client;
assigning the workflow execution to a first workflow engine;
determining whether the workflow execution has been successfully completed by the first workflow engine;
only if so, sending a notification to the client;
otherwise, assigning the workflow execution to a subsequent workflow engine by sending it a work assignment message, and the subsequent workflow engine alone completing the workflow; and
sending a notification to the client only if the workflow is successfully completed by the subsequent workflow engine;
wherein sending is performed by a certified messaging capability; and
wherein the certified messaging capability is performed by a certified message receiver in the first workflow engine;
the certified messaging capability sending the notification to the client only if the workflow execution is successfully completed by the subsequent workflow engine.

12. The article recited in claim 11, wherein requesting is performed by a load manager having a distributed queuing capability.

* * * * *